(12) United States Patent
Boyd et al.

(10) Patent No.: US 6,282,374 B1
(45) Date of Patent: Aug. 28, 2001

(54) CAMERA HAVING LABEL-STOPPED OPTICAL SYSTEM

(75) Inventors: James D. Boyd, Rochester; Stephen J. Smith, Shortsville; Michael P. Cramer, Victor, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/360,752

(22) Filed: Jul. 26, 1999

(51) Int. Cl.[7] .............................. G03B 17/02; G03B 11/00
(52) U.S. Cl. .................................. 396/6; 396/544
(58) Field of Search ................................. 396/6, 322, 332, 396/333, 529, 530, 531, 532, 533, 544, 545

(56) References Cited

U.S. PATENT DOCUMENTS

| | | | |
|---|---|---|---|
| 3,273,478 | 9/1966 | Kinder | 396/176 |
| 4,540,265 | 9/1985 | Harvey | 396/163 |
| 4,972,649 | 11/1990 | Mochida et al. | 53/430 |
| 5,034,766 | * 7/1991 | Ziegler | 396/544 |
| 5,068,575 | 11/1991 | Dunsmore et al. | 315/241 P |
| 5,235,366 | 8/1993 | Kucmerowski | 396/387 |
| 5,239,326 | * 8/1993 | Takai | 396/529 |
| 5,400,098 | * 3/1995 | Rydelek | 396/535 |
| 5,461,416 | * 10/1995 | Bettinardi | 348/62 |
| 5,472,543 | 12/1995 | Yokajity | 156/249 |
| 5,557,356 | 9/1996 | Ishida et al. | 396/6 |
| 5,614,975 | 3/1997 | SanGregory et al. | 396/396 |
| 5,634,163 | 5/1997 | Kamata . | |
| 5,652,930 | 7/1997 | Teremy et al. | 396/287 |
| 5,761,542 | 6/1998 | Lamphron et al. | 396/6 |
| 5,873,002 | 2/1999 | Glanville, Sr. et al. | 396/6 |
| 5,970,256 | * 10/1999 | Sangregory et al. | 396/6 |

FOREIGN PATENT DOCUMENTS

| | | |
|---|---|---|
| 0 537 908 A2 | 9/1992 | (EP) . |
| 5134361 | 5/1993 | (JP) . |
| 7114147 | 5/1995 | (JP) . |

* cited by examiner

Primary Examiner—David M. Gray
(74) Attorney, Agent, or Firm—Robert Luke Walker

(57) ABSTRACT

A camera has a body and a label adhered to the body. The body has a lens assembly including a taking lens. The taking lens defines an optical axis. The taking lens has at least one optical element. The optical element has a central part and a peripheral part. The lens assembly has a label receiving surface. The label receiving surface has an outer perimeter. The label receiving surface is free of obstructions to label-placement. The label is adhered to the label receiving surface in spaced relation to the outer perimeter. The label has a hole disposed substantially concentric with the optical axis. The label includes an opaque blocking portion surrounding the hole and overlapping the peripheral part.

24 Claims, 14 Drawing Sheets

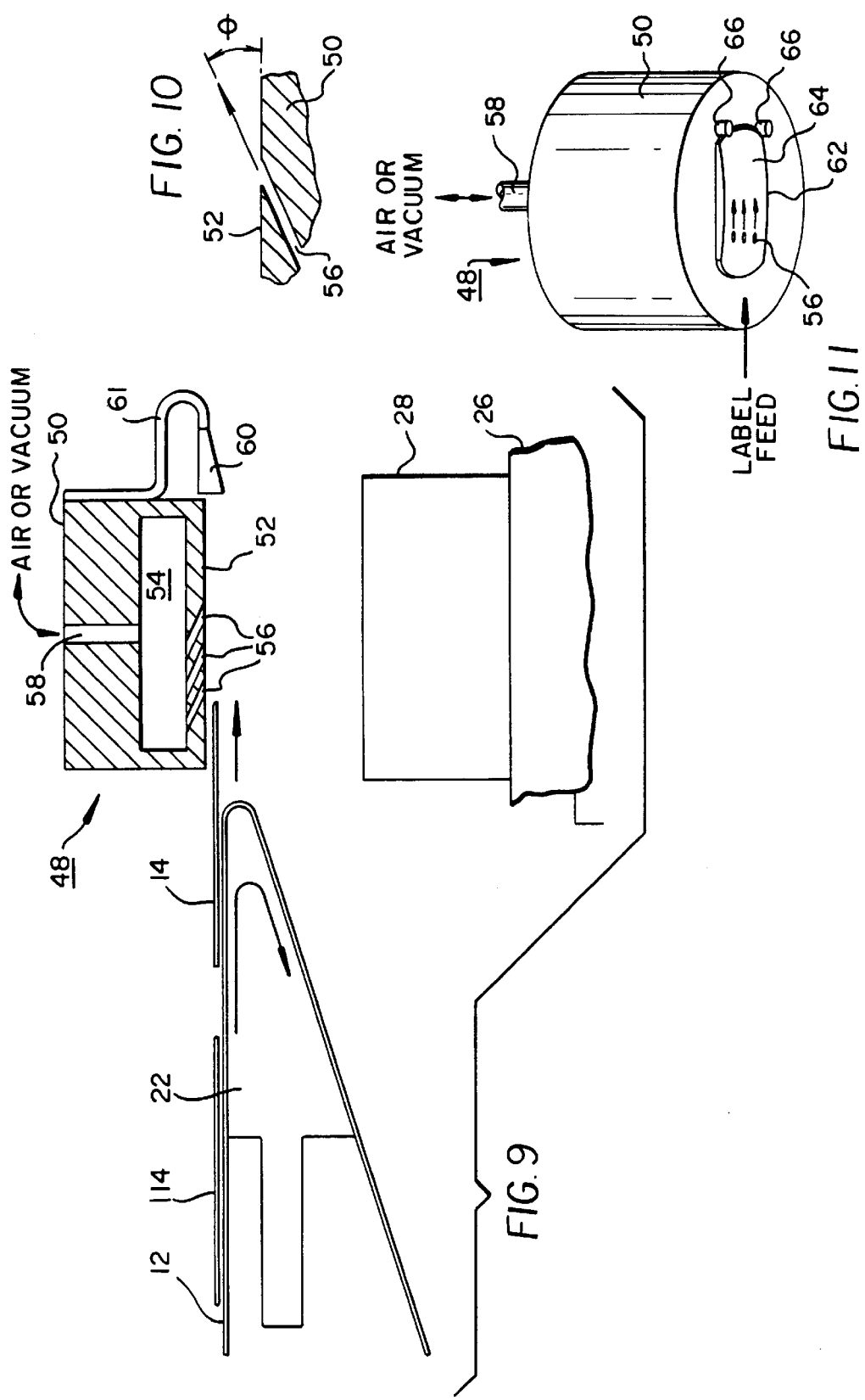

CAMERA HAVING LABEL-STOPPED OPTICAL SYSTEM

CROSS REFERENCE TO RELATED APPLICATIONS

Reference is made to commonly assigned, U.S. patent applications Ser. No. 09/360,432, entitled: CAMERA HAVING RESILIENTLY BIASING LABEL AND METHOD, filed Jul. 26, 1999, in the names of James D. Boyd, Stephen J. Smith, and Michael P. Cramer; U.S. Ser. No. 09/361,057, entitled: CAMERA HAVING LABEL MOUNTED ELECTRICAL COMPONENT, filed Jul. 26, 1999, in the names of James D. Boyd, Stephen J. Smith, and Michael P. Cramer; U.S. Ser. No. 09/360,576, entitled: METHOD FOR ASSEMBLING CRITICALLY POSITIONED CAMERA COMPONENT ON CAMERA BODY, filed Jul. 26, 1999, in the names of James D. Boyd, Stephen J. Smith, and Michael P. Cramer; U.S. Ser. No. 09/360,909, entitled: CAMERA HAVING LIGHT-BLOCKING LABEL, filed Jul. 26, 1999, in the names of James D. Boyd, Stephen J. Smith, and Michael P. Cramer; U.S. Ser. No. 09/361,637, entitled: CAMERA HAVING LABEL INCLUDING OPTICAL COMPONENT, filed Jul. 26, 1999, in the names of James D. Boyd, Stephen J. Smith, and Michael P. Cramer; U.S. Ser. No. 09/360,908, entitled: ONE-TIME USE CAMERA HAVING BREAKABLE COMPONENT AND RECYCLING METHOD, filed Jul. 26, 1999, in the names of James D. Boyd, Stephen J. Smith, and Michael P. Cramer; U.S. Ser. No. 09/360,056, entitled: ONE-TIME USE CAMERA LOADING METHOD, filed Jul. 26, 1999, in the names of James D. Boyd, Stephen J. Smith, and Michael P. Cramer each of which are assigned to the assignee of this application.

FIELD OF THE INVENTION

The invention relates to photography and cameras and more particularly relates to cameras having aperture stops provided by labels.

BACKGROUND OF THE INVENTION

Cameras have long used aperture stops to reduce the optical aperture of a lens to a central part. Simple aperture stops have been provided as a hole or series of holes in a part that is interposed, or interposable, in front of an element of the taking lens. For good image quality, the hole of the aperture stop should be precisely sized and positioned concentric with the optical axis of the taking lens. A wide variety of mechanical diaphragms and other mechanisms are known for relatively expensive cameras. Inexpensive cameras are commonly provided with a fixed aperture stop. Single use cameras are recycled and may use different films and lenses during different cycles. This is accommodated by use of a single aperture stop provided on an removable insert. The separate insert is simple and inexpensive to manufacture with a precise hole. (The insert is commonly a flat disk with a hole in the middle. Concentricity of the insert with the optical axis is not a function of the insert, but rather a holder or guide that is used to position the insert relative to the optical axis. The holder or guide, and any necessary supporting structure, cannot be manufactured with precision as simply and inexpensively as the insert.

One-time use cameras are widely available which include labels that describe use of the camera and have other useful or decorative information. U.S. Pat. No. 5,472,543 entitled Method for Label Application Using Bernoulli Effect", which is hereby incorporated herein by reference, discloses a labeling method in which a label is floated on an air cushion into a substantially exact alignment with an area of an item receiving the label. It has been determined that the accuracy of the label placement provided by this method is very great.

It would thus be desirable to provide a camera that has a precisely positioned aperture stop, but does not require a holder or guide to position the stop relative to the optical axis of the taking lens.

SUMMARY OF THE INVENTION

The invention is defined by the claims. The invention, in its broader aspects, provides a camera having a body and a label adhered to the body. The body has a lens assembly including a taking lens. The taking lens defines an optical axis. The taking lens has at least one optical element. The optical element has a central part and a peripheral part. The lens assembly has a label receiving surface. The label receiving surface has an outer perimeter. The label receiving surface is free of obstructions to label-placement. The label is adhered to the label receiving surface in spaced relation to the outer perimeter. The label has a hole disposed substantially concentric with the optical axis. The label includes an opaque blocking portion surrounding the hole and overlapping the peripheral part.

It is an advantageous effect of the invention that a camera is provided that has a precisely positioned aperture stop, but does not require a holder or guide to position the stop relative to the optical axis of the taking lens.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 9 is a schematic of the labeler head of the labeler of FIG. 8.

FIG. 10 shows a fragmentary sectional view of the labeler head of FIG. 9, indicating the orientation of the bores for the gas jets.

FIG. 11 shows a perspective view of a second embodiment of the labeler head.

DETAILED DESCRIPTION OF THE INVENTION

Figure 1:
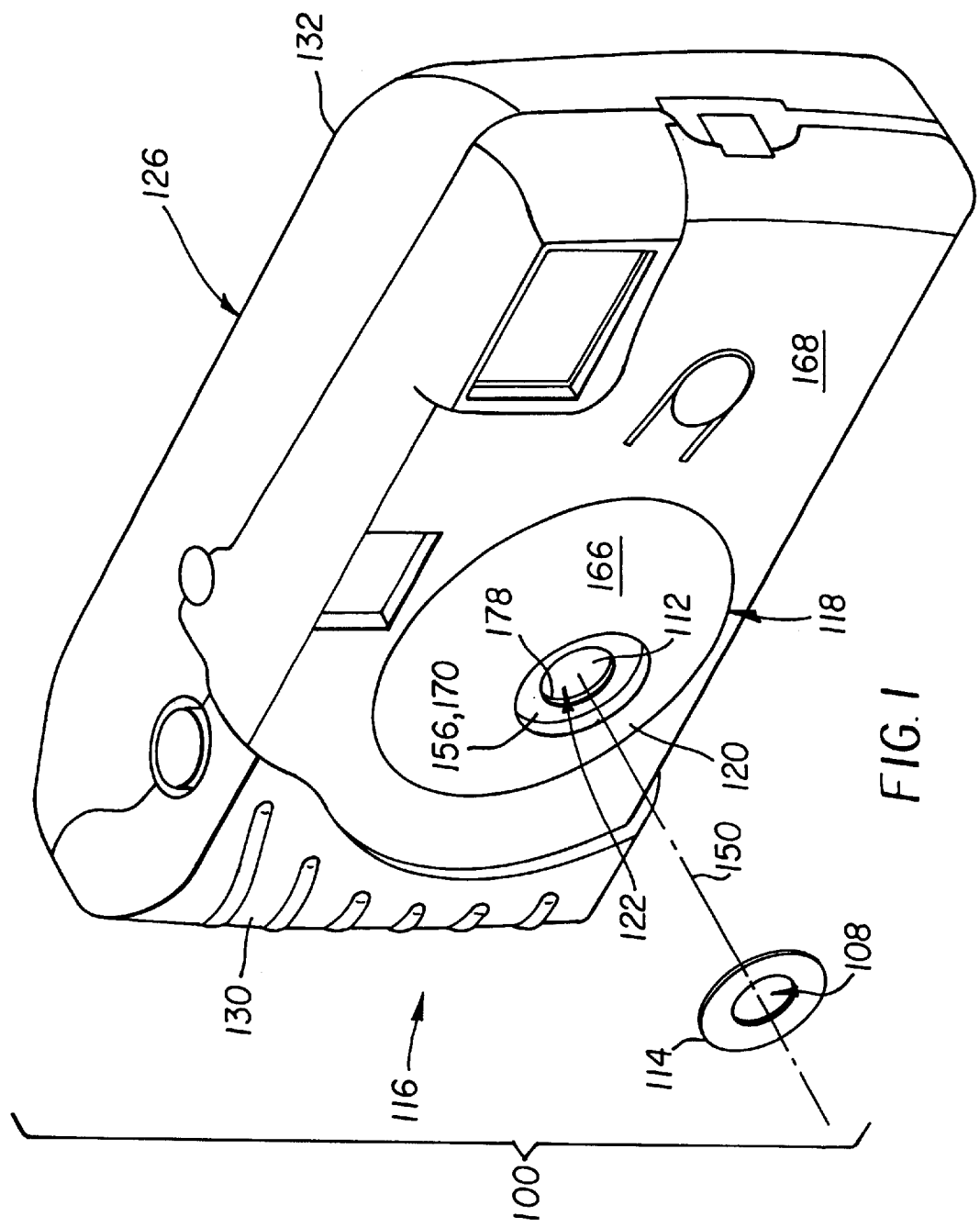
FIG. 1 is a perspective view of an embodiment of the camera. The label is illustrated separated from the body.

In the invention, the taking lens 112 of a camera 100 is partially blocked by an accurately positioned label 114 that has a hole 108 that acts as an aperture stop. The label 114 can also be positioned to vignette captured images. The invention is applicable to reusable and one-time use cameras, but is particularly convenient for one-time use cameras having a fixed shutter speed. In one-time use cameras of the invention, the stopped taking lens aperture can be readily matched to film 138 speed when the film 138 is initially loaded in the camera and when film 138 is reloaded after camera recycling, even if the speed of the reloaded film 138 is changed from the initial film 138 speed.

Referring now particularly to FIGS. 1–7, the camera 100 has a body 116 and the label 114 is adhered to the body 116. The body 116 has a lens assembly 118 that includes the taking lens 112 and a cradle 120 that supports and partially encloses the taking lens 112. The taking lens 112 and an opening 122 in the cradle 120 define an initial optical aperture and an unstopped field of view corresponding to that optical aperture. The label 114 blocks light originating in a part of that field of view from entering the opening 122, stopping the taking lens 112 down to a final aperture smaller than the initial aperture. The unstopped field of view is indicated by double-headed arrow 124 and adjoining dashed lines in FIG. 2. The stopped field of view is indicated by double-headed arrow 125 and adjoining dashed lines in FIG. 2.

The cradle 120 is part of a casing 126 that includes a frame 128 and two or more covers 30,32 that are attached over the frame 128. The casing 126 supports camera components and encloses a film area 134. The film area 134 includes an exposure chamber 136 to which light is directed by the taking lens 112 for picture taking. Within the casing 126, in the film area 134, unexposed film 138 is moved from a first film chamber 140, across an exposure chamber 136, to a second film chamber 142. The type of film and manner of film transport is not critical. For example, a one or two chamber film cartridge or a cartridgeless film roll 143 can be used. Film can be prewound and be returned to a film cartridge at the time of film exposure, or rewinding after exposure can be required. The embodiment illustrated in the figures is a one-time use camera 100, in which a film roll 143 housed in an otherwise empty film supply chamber 140, is moved by a film transport (indicated schematically by box 144) across an exposure chamber 136 to a film cartridge 145 housed in a film cartridge chamber 142. The exposure chamber 136 is between the opposed film chambers 140,142 and has a baffle through which light is admitted from the taking lens 112 when film exposures are made. The chambers 136,140,142 are parts of the frame 128. Joined to the frame 128 are various camera components 147 (illustrated by boxes in FIG. 2) that, together with the frame 128, comprise a frame 128 assembly 128a. Examples of such components include a viewfinder, a flash unit, an shutter mechanism, and the film transport 144. The components 147 include appropriate control features that extend through the casing 126. The shutter mechanism includes a shutter button. The film transport 144 includes a thumbwheel or advance lever. Suitable components and other features of the camera 100 that are not illustrated, are well known to those of skill in the art.

The taking lens 112 has one or more optical elements including at least one lens element 148 having an optical power. The taking lens 112 and element or elements 48 define an optical axis 150. The lens element 148 nearest the label 114 (also referred to as the stopped lens element 148a) has a central part 152 that defines a predetermined light cone aligned with the optical axis 150. The label 114 stops the taking lens 112 to a final aperture providing this predetermined light cone within a close tolerance. Stopped lens element 148a also has a peripheral part 154 that defines undesired light paths into the film area 134. The undesired light paths are not blocked by the body 116. The peripheral part 154 of lens element 148a can be an outer ring of a lens that would allow entry of excess light in view of shutter and film parameters. The peripheral part 154 can instead or additionally include a support structure 155, such as a support ring provided as a molded in feature of a plastic lens. The peripheral part 154 can include a gap or other perforation (not shown), but it is preferred that the peripheral part is imperforate to protect against intrusion of foreign objects.

Figure 7:
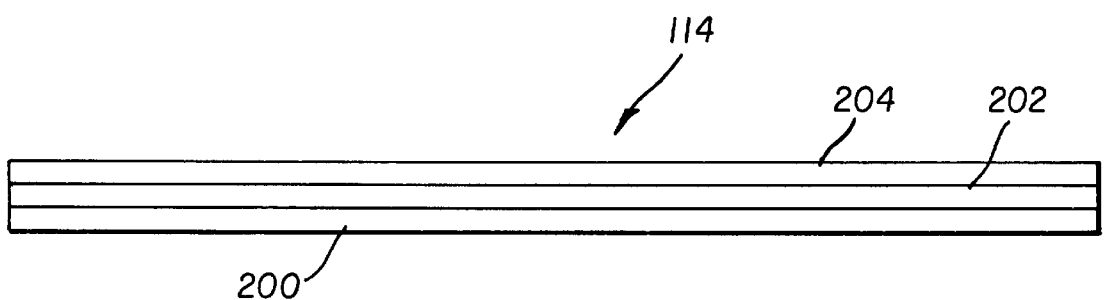
FIG. 7 is a semi-diagrammatical cross-section of the label of the camera of FIG. 1.
Figure 8:
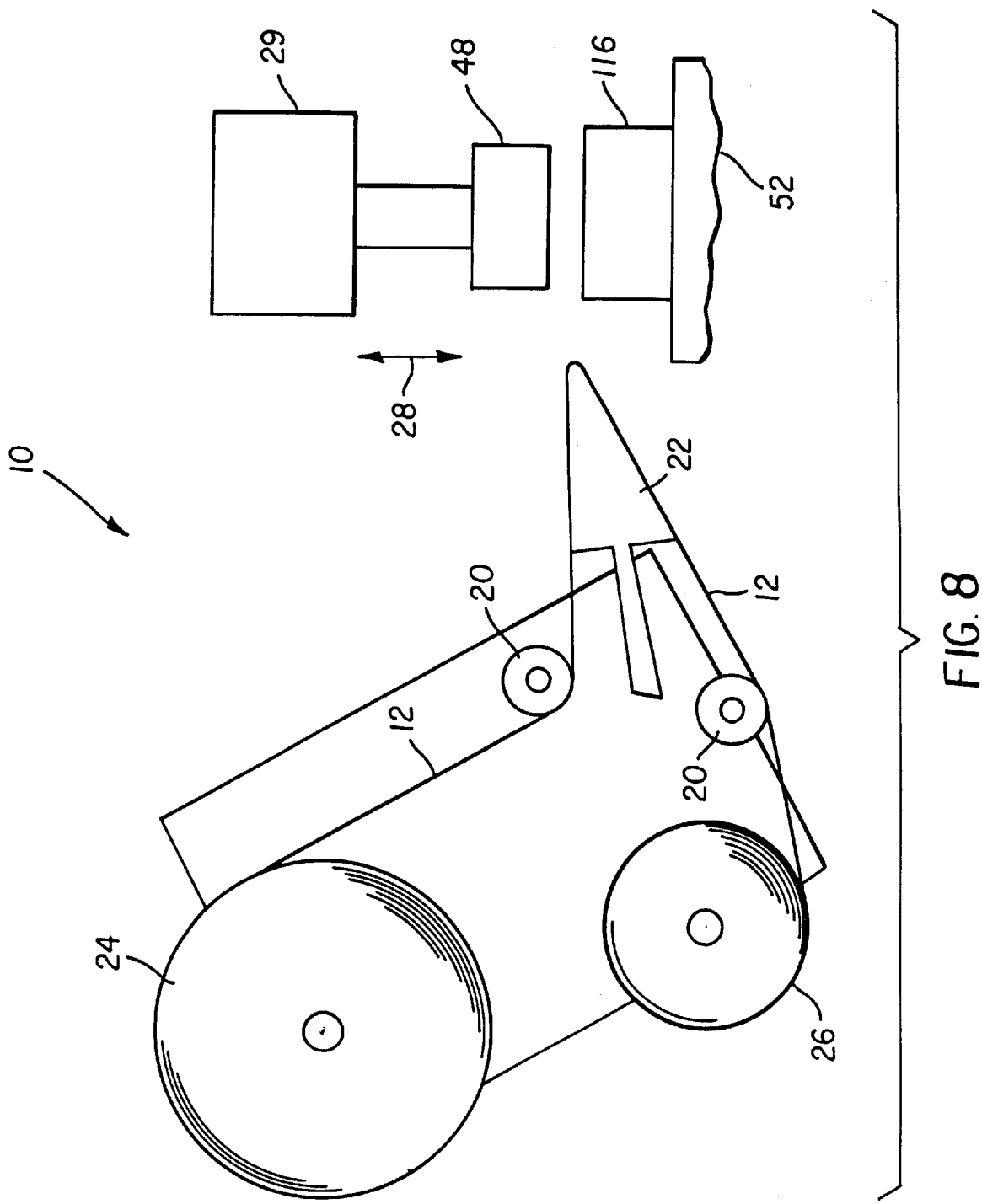
FIG. 8 is a semi-diagrammatical view of an embodiment of a Bernoulli labeler.

The body 116 of the camera 100 has a label receiving surface 156 to which the label 114 is adhered. The label receiving surface 156 has an outer perimeter 158. The label 114 is spaced apart from the outer perimeter 158 and is positioned so as to overlap the peripheral part 154 of the lens element 148. The label 114 blocks the peripheral part 154, within a close tolerance, to exclude glare and stray light and to reduce possible aberration due to non-centering of the light cone on the optical axis 150. The label 114 is opaque, at least in a blocking portion 159 that overlies the peripheral part 154 of the lens element 148a, to prevent entry of light through the peripheral part 154. The remainder of the label 114 can be opaque or transparent, or have both opaque and transparent areas, as desired. An example of a suitable label material is a polymeric blend of polystyrene and polyethylene. Opacity can be provided by use of a thicker label material or can be conveniently provided by use of a multiple layer label, in which all or part of one of the layers is metallized plastic or metallic foil. FIG. 7 illustrates such a label, in which an adhesive layer 200 is bonded to a layer 202 of metallized plastic, to which is bonded a layer 204 of printable material such as paper or printable plastic. Such labels are inexpensive and are well known to those of skill in the art.

The label receiving surface 156 is free of obstructions to label-placement in any of a variety of positions on the label receiving surface 156. In other words, the label receiving surface 156 is free of invasive surface relief, such as protuberances, that would deter attachment of the label 114 or would cause the a label 114 to attach in a manner in which the label 114 would be distorted and unable to block light entry. It is currently preferred that the label receiving surface 156 is completely smooth or uniformly textured with surface relief varying over a dimension much smaller than the thickness of the label 114. The label receiving surface 156 can have one or more areas of greater surface relief that does not interfere with adherence and the light blocking. For example, in particular embodiments the label 114 is compliant and the label receiving surface 156 has slight surface relief to which the label 114 conforms smoothly and light-tightly. If the label receiving surface 156 is curved, it is preferred that the label 114 is sufficiently compliant to accommodate the non-planarity of the label receiving surface 156, in addition any necessary accommodation of surface relief. The label receiving surface 156 can also have a form of surface relief, such as circumscribing groove (not illustrated), that can be bridged by the label 114 without loss of light-tightness.

Since the label receiving surface 156 is free of invasive surface relief which could interfere with placement of the label 114, the label receiving surface 156 is also free of structures which could be used to guide placement of the label 114. As a result, the label 114 must be positioned by apparatus and methods that provide accurate and precise positioning without requiring a guide structure on the label receiving surface 156. For good image quality (reduced aberration and stray light), it is very important that the label 114 be concentric with the optical axis 150 of the taking lens system 12. A variety of conventional apparatus and methods can position the label 114 on the label receiving surface 156 with a concentricity of the hole 108 and the optical axis 150 to within a tolerance dimension greater than about 0.8 mm. It is preferred, however, that the hole 108 in the label 114 has a center that lies in a circle 0.6 mm in diameter centered on the optical axis 150. (This is a tolerance of ±0.3 mm or less. It is more preferred that the circle is 0.4 mm (a tolerance of ±0.2 mm) and still more preferred that the circle is 0.2 mm (a tolerance of ±0.1 mm). This is particularly important for cameras having inexpensive, small lenses, since the portion of the light cone effected is greater. For example, one-time use cameras use plastic molded lenses, which, in many cases, are 10–20 mm in diameter.

Referring now to FIGS. 8–24, the labels 14 can be attached concentric with the optical axis 150 to within a tolerance of less than 0.3 mm using the Bernoulli effect labeler heads 48, labeling apparatus 10, and methods disclosed in U.S. Pat. No. 5,472,543. Concentricities of better than 0.3 mm and better than 0.2 mm can be provided by careful tolerancing of all manufacturing components or by culling of cameras with the greatest variance, or both. The labeler head 48 comprises a main member 50 having a support surface 52 which may be flat, or convex and substantially cylindrical with an axis of curvature. A plenum 54 within the main member 50 communicates with a plurality of bores 56 extending from the plenum 54 through the support surface 52. The bores 56 are angled with respect to the support surface 52 and arranged in an array so that jets of gas issuing from the array will cause a label 114 to be drawn onto the support surface 52 when the label 114 is presented to the support surface 52 and a first side of the label 114 is brought into close proximity of the jets, thereby causing a zone of reduced gas pressure to be formed between the support surface and the first side of the label and establishing a pressure differential across the label 114 to hold the label 114 on a film of gas flowing over the support surface 52. A gas supply (not shown) provides a flow of gas into the plenum 54 and through the angled bores 56. The gas supply provides pulses of higher pressure gas to propel labels 114 against the camera body 116 to be labeled and can provide a vacuum to the labeler head 48 as necessary to hold label 114.

In the apparatus 10, an elongated carrier strip 12 has a surface having low affinity for the adhesive-backed side of a plurality of pressure-sensitive labels 114. Display sides of the labels face outward from the carrier strip 12. Labels 114 can be of practically any shape and are moderately stiff, to facilitate ready removal from the carrier strip 12. The carrier strip is wound in a large roll 24 prior to label removal. The used carrier strip 12, depleted of labels 114, is likewise wound in a roll 26. The rolls 24,26 are mounted to the apparatus 10 for rotation such that strip 12 is pulled around an idler roller 20 and then around the edge of a peeler plate 22. Because the adhesive backing on labels 114 has a low affinity for the surface of strip 10 and because labels 114 have a certain resistance to bending, the labels release gradually and automatically from strip 10 as the strip passes around the edge of the peeler plate 22 and are presented substantially tangentially to the labeler head 48. The labeler head 48 is reciprocated in directions indicated by double-headed arrow 28 by a drive 29. The body 116 is supported on a bracing or conveyor 30. A nest (not shown) can be used to support the body 116.

Figure 12:
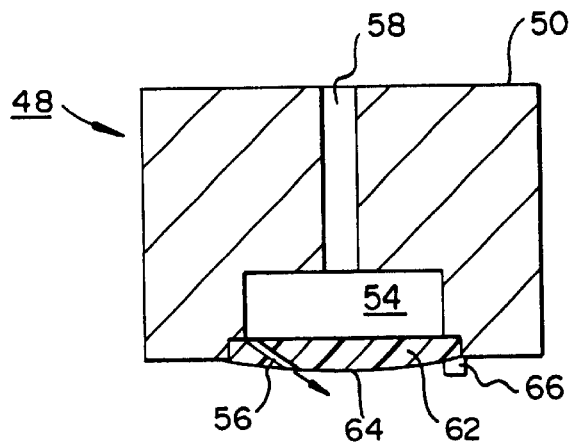
FIG. 12 shows an elevation section view through the labeler head of FIG. 11.

The main member 52 of the labeler head 48 is a material such as metal or rigid plastic or a resilient material. The support surface is smooth and typically flat. Within main member 50, a plenum 54 communicates with a plurality of bores 56 which extend from plenum 54 to support surface 52. In a particular embodiment of the invention, bores 56 have a diameter in the range of 0.012 to 0.032 inch (0.030 to 0.081 cm) and are set at an angle, to support surface 52, in the range of 5 to 45 degrees. A port 58 is provided through main member 50 to connect plenum 54 to the gas supply to provide pressurized air or subatmospheric pressure. Bores 56 are arranged in an array so that jets of gas issuing from the bores will cause label 114 to be drawn onto support surface 52 when the label 114 is presented to the support surface and its display side is brought into close proximity with the jets of gas. The flow of gas causes a zone of reduced gas pressure to be formed between support surface 52 and label 114, in accordance with the Bernoulli Effect, thereby establishing a pressure differential across the label 114 to hold the label 114 in position on a film of gas flowing over the support surface. The array is also configured so that, once released, label 114 will move relative to support surface 52 and reposition itself accurately against one or more stops 60 provided on or adjacent the support surface. Just as shown in FIGS. 9, and 16–24, with the labeler head of FIGS. 6 to 12, label 114 covers the portion of the array of bores 56 which are at least partially directed toward stops 60, when the label 114 is positioned against the stops. Thus, the rear or upstream edge of the label 114 is not subjected to air flows which could dislodge it from its position against the stops. Stops 60 can be supported on resilient springs 61, which allow the stops to be depressed to the level of support surface 52 during label 114 application. Preferably, stops 60 are made from a material to which the adhesive of the labels 114 will not stick readily, such as Rulon, a plastic material made by Dixon Industries Corp. of Bristol, R.I. U.S.A FIGS. 11–12 illustrate another labeler head 48 useful with the apparatus 10, in which flat support surface 52 is replaced by a resilient insert 62 of a material such as silicon rubber which has cylindrical, convex support surface 64 having an axis of curvature transverse to the direction from which label 114 is fed to labeler head 48. A pair of stop pins or abutments 66 are provided on one side of support surface 64. Stop pins 66 preferably also are made from a non-stick material such as Rulon. In a particular embodiment, at least a portion of bores 56 are angled so that their jets of gas are directed at least partially toward stop pins 66 and do not oppose movement of label 114 onto the labeler head. By "at least partially toward" is meant that none of the air jets includes a vector component which would oppose movement of the label 114 across support surface 64. For round labels 114, the jets from bores 56 preferably are symmetrically placed on either side of the path of the label 114 onto the labeler head. Round labels 114 upon release will move across support surface 64 into accurate engagement with stop pins 66. The label 114 may be provided with a radially inwardly or outwardly extending feature which is engaged by the stop pins 66. The label 114 may have a central aperture; and the main member 50 may have a locator pin (not illustrated in this embodiment) positioned centrally of the array, the pin being sized to pass through the aperture of the label 114 and preferably being retractable. Non-symmetric arrays of bores are also useful, for example, with rectangular labels 114. The resilient material of insert 62 and the cylindrical shape of support surface 64 ensure that when the labeler head is pressed against a body 116 to apply label 14, essentially line contact is first established due to the cylindrical shape and then the insert compresses, so that the label 114 is smoothly applied without bubbles or wrinkles.

Figure 13:
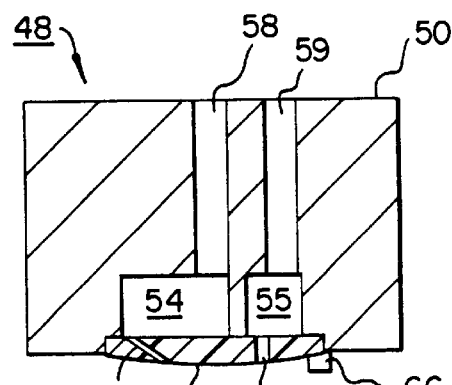
FIG. 13 shows an elevation section view of a third embodiment of the labeler head.

FIG. 13 shows a modification of the labeler head of FIGS. 11–12. Within main member 50, a second plenum 55 communicates with one or more bores 57 which extend from plenum 55 to support surface 64. Such a second plenum 55 and bores 57 also may be included in the other labeler heads discussed. A port 59 is provided from plenum 55 to a source of pressurized air;, so that, a blast of air through bores 57 may be used to blow the label 114 onto the body 116 to be labeled.

Figure 14:
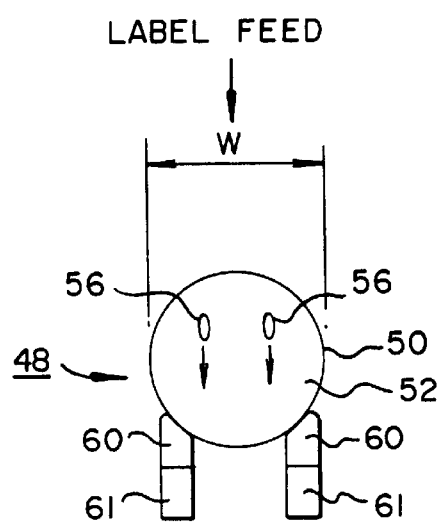
FIGS. 14–15 show plan views of modifications of the labeler heads of FIGS. 9–13.
Figure 15:
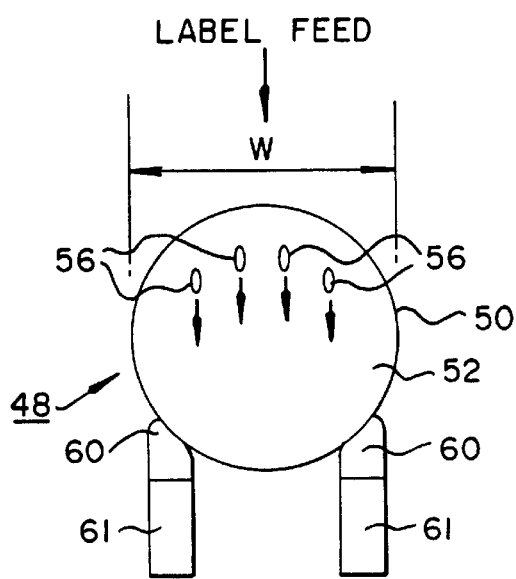

FIGS. 14–15 illustrate typical arrays of bores 56 for labeler heads 48 of FIGS. 9–13, having flat support surfaces 52 approximately 0.6 and 1.0 inch (1.52 and 2.54 cm), respectively, in width ("W" in FIGS. 14–15). The number of bores depends upon the area and weight of the label 114. The arrows indicate the direction of the jets from bores 56 toward stops 60, preferably so that no vector component of any jet will oppose movement of label 14 onto support surface 52. For round labels 114, the jets preferably are symmetrically placed relative to the path of the label 114. Thus, round labels 114 upon release will move across support surface 52 into accurate engagement with stops 60. Similar arrays of bores may be used for labels 114 of other shapes.

Figure 16:
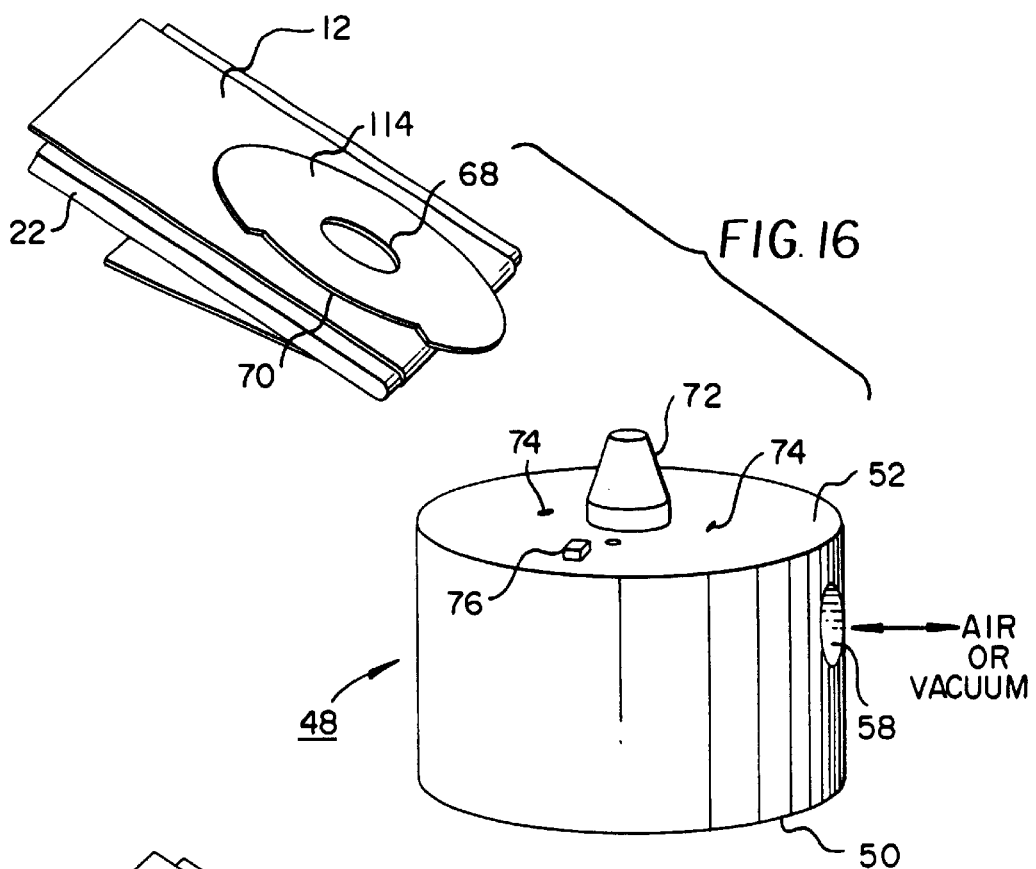
FIGS. 16–19 show perspective views, some in section, of a fourth embodiment of the labeler head.
Figure 17:
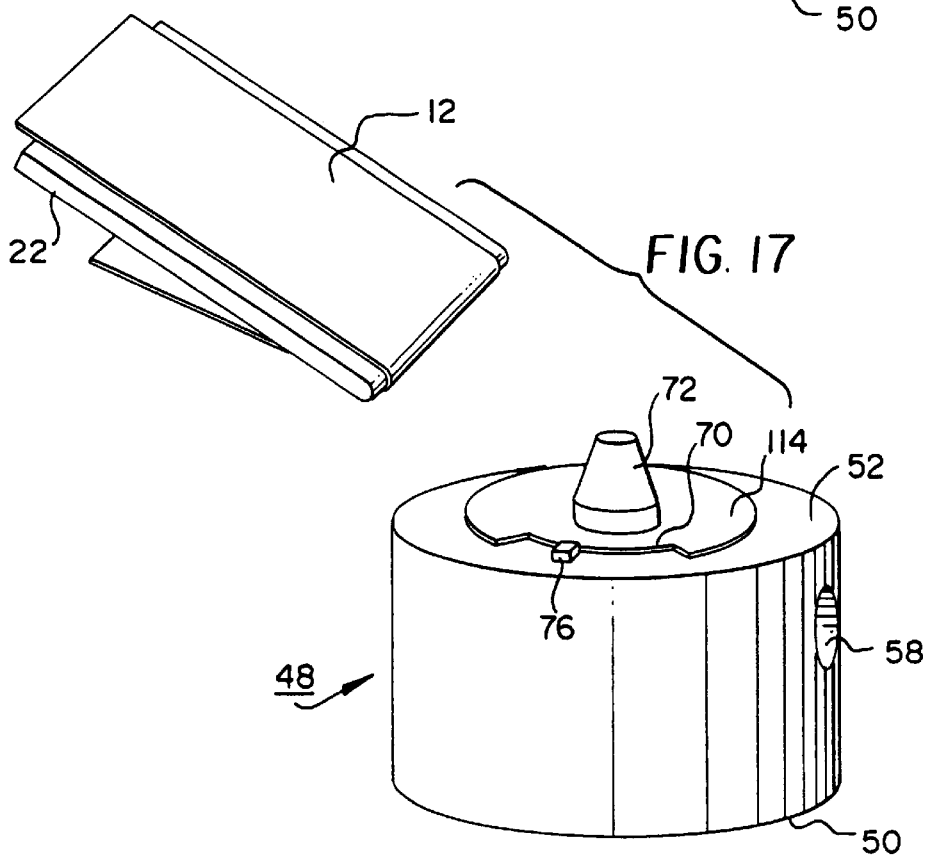
Figure 18:
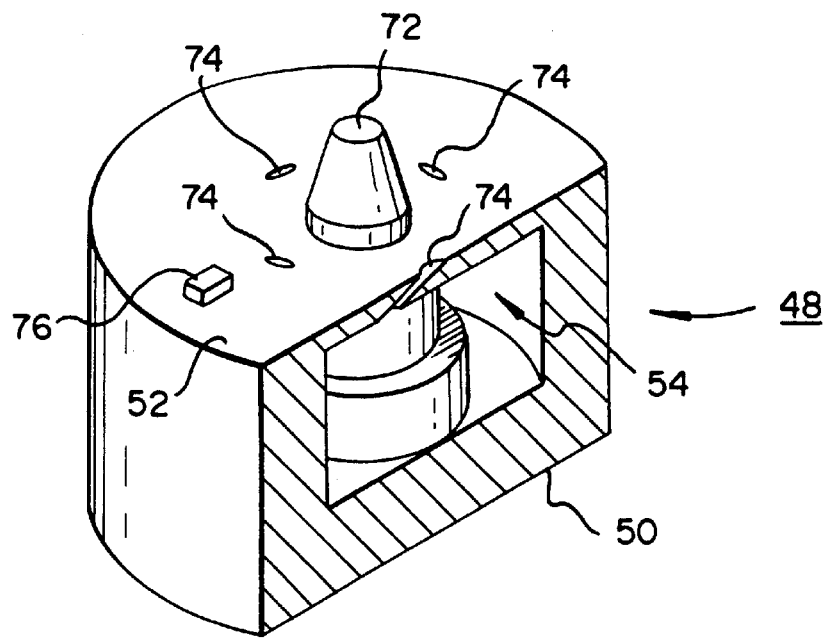
Figure 19:
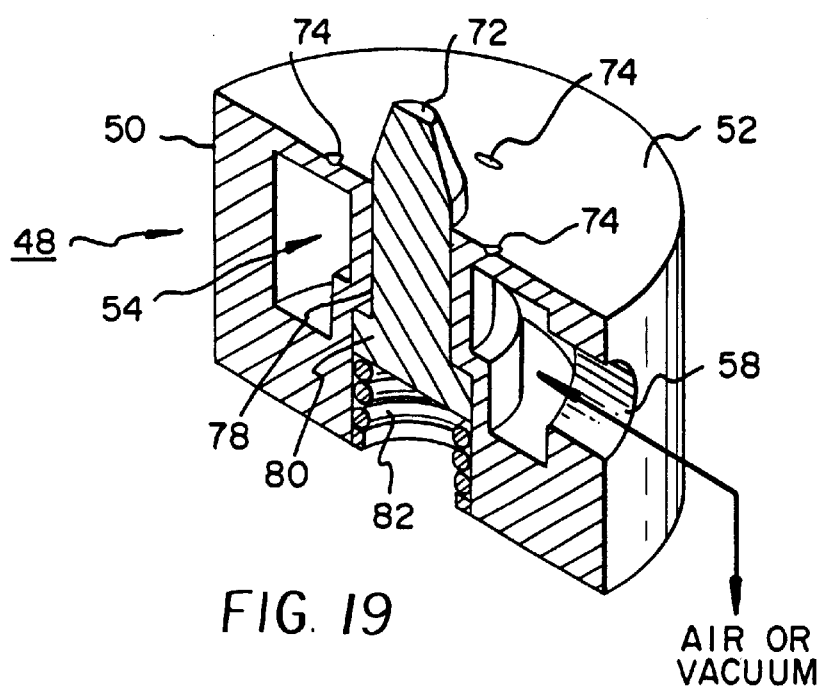

FIGS. 16–19 illustrate another labeler head 48 which is suited for applying labels 14 having a central hole 108 and a radially inwardly extending feature such as a notch 70 extending over an arc of the circumference of the label 114. In this case, main member 50 is provided with a centrally positioned, tapered locator pin 72 which extends from support surface 52. The diameter of locator pin 72 preferably is only slightly smaller than that of central hole 108, to accurately center the label 114 on the labeler head 48. Surrounding locator pin 72 is an array of angled bores 74 whose jets extend in generally the same sense or circular direction about locator pin 72. When label 14 is released so that locator pin 72 enters hole 108, the label 114 will move down onto and spin around locator pin 72 until notch 70 settles over an axially extending stop or abutment 76, thereby stopping movement of the label 114 and accurately centering and angularly positioning it for application. As shown in FIG. 16, label 14 covers the portion of the array of bores 74 which are at least partially directed toward stop 76, when the label 114 is positioned against the stop. Thus, the circumferential edge of the label 114 is not subjected to air flows which could dislodge it from its position against the stop. Preferably abutment 76 is retractable during application of the label 114, (not illustrated). As shown in FIGS. 18–19, main member 50 has a central stepped passage, which is surrounded by plenum 54, and in which locator pin 72 is slidably mounted. A head 80 on the locator pin is pressed against by a spring 82; so that, locator pin 72 is retractable but is biased to extend beyond support surface 52 as illustrated. As will be discussed further with respect to FIG. 23, the retractability of locator pin 72 facilitates use of labeler head 48 to accurately place label 14 around an opening 122 in the body 116 to be labeled. Subatmospheric pressure can be applied to plenum 54 after the label 114 has been acquired and repositioned.

Figure 20:
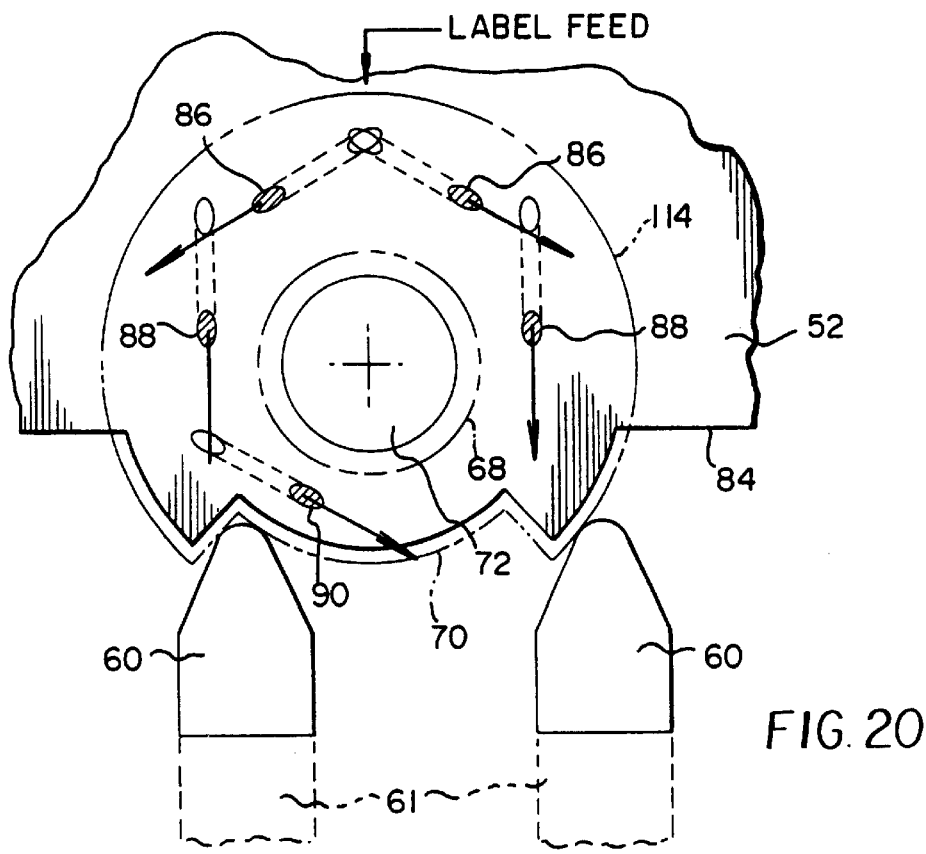
FIG. 20 shows a plan view and FIGS. 21–24 show perspective views, some in section, of a fifth embodiment of the labeler head.
Figure 21:
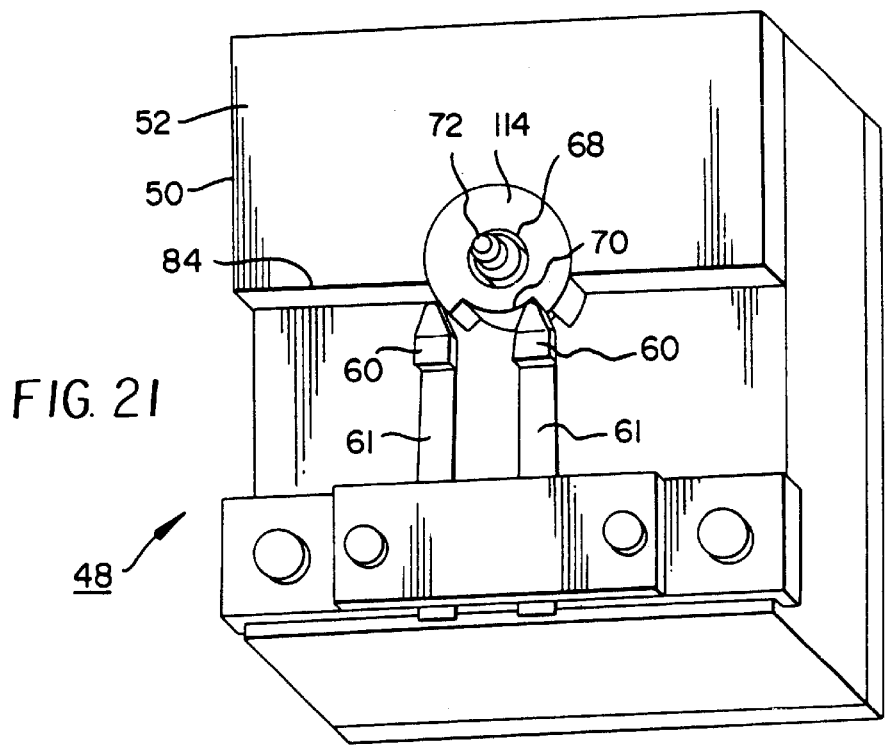
Figure 22:
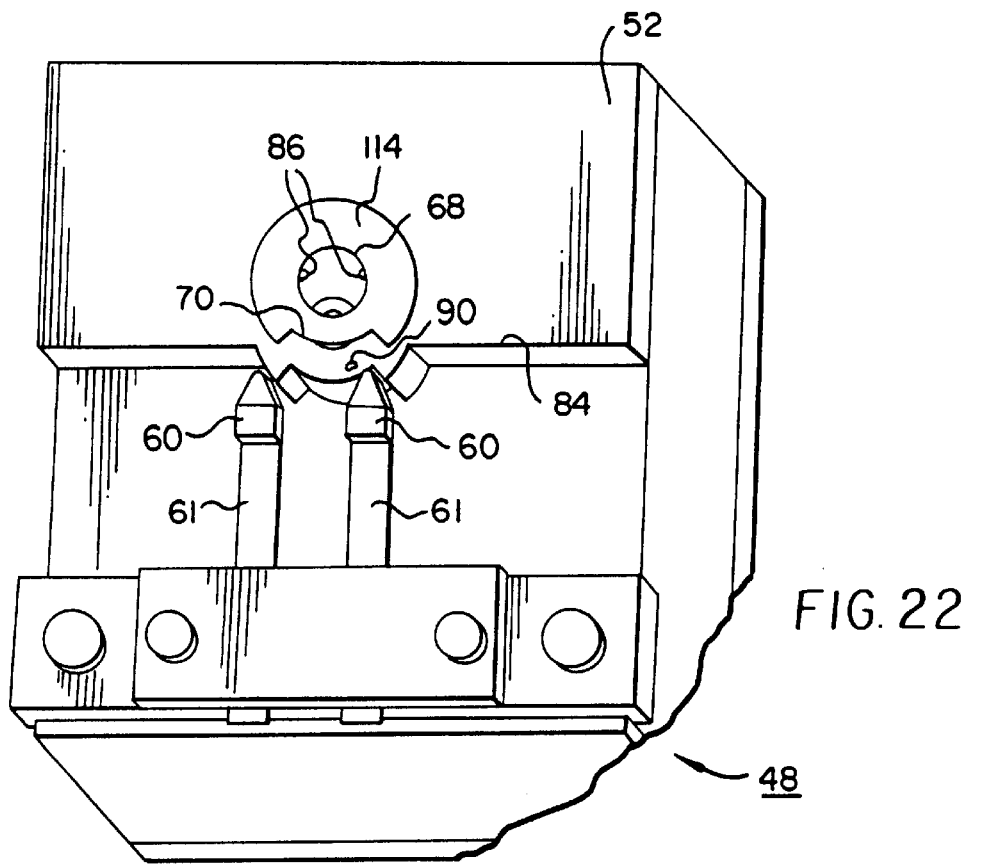
Figure 23:
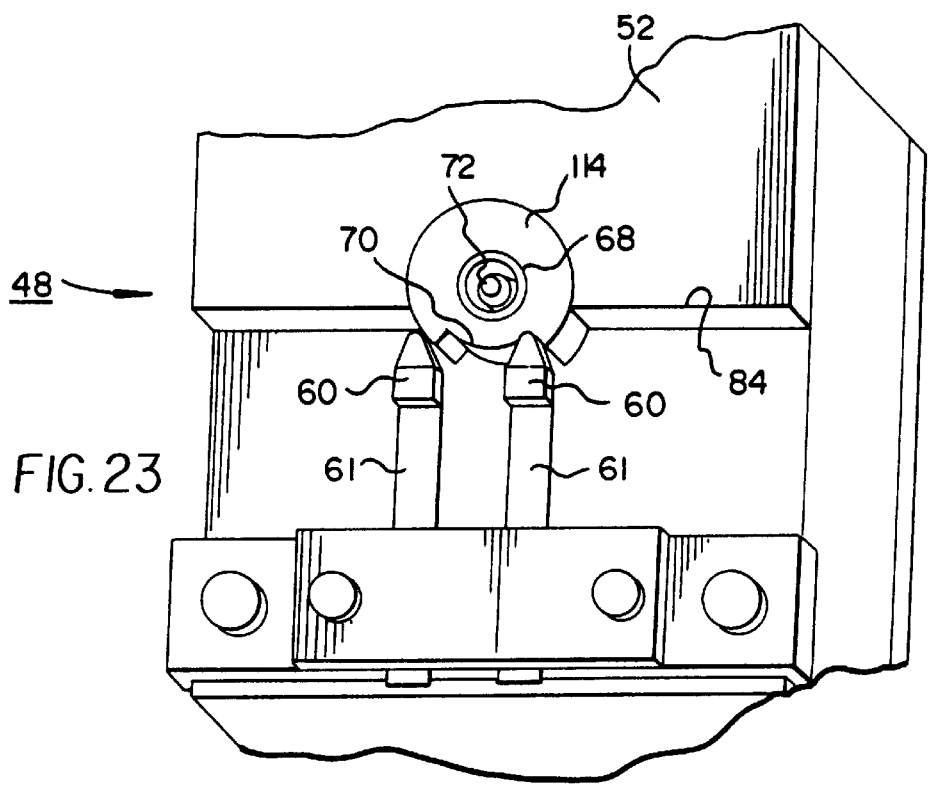
Figure 24:
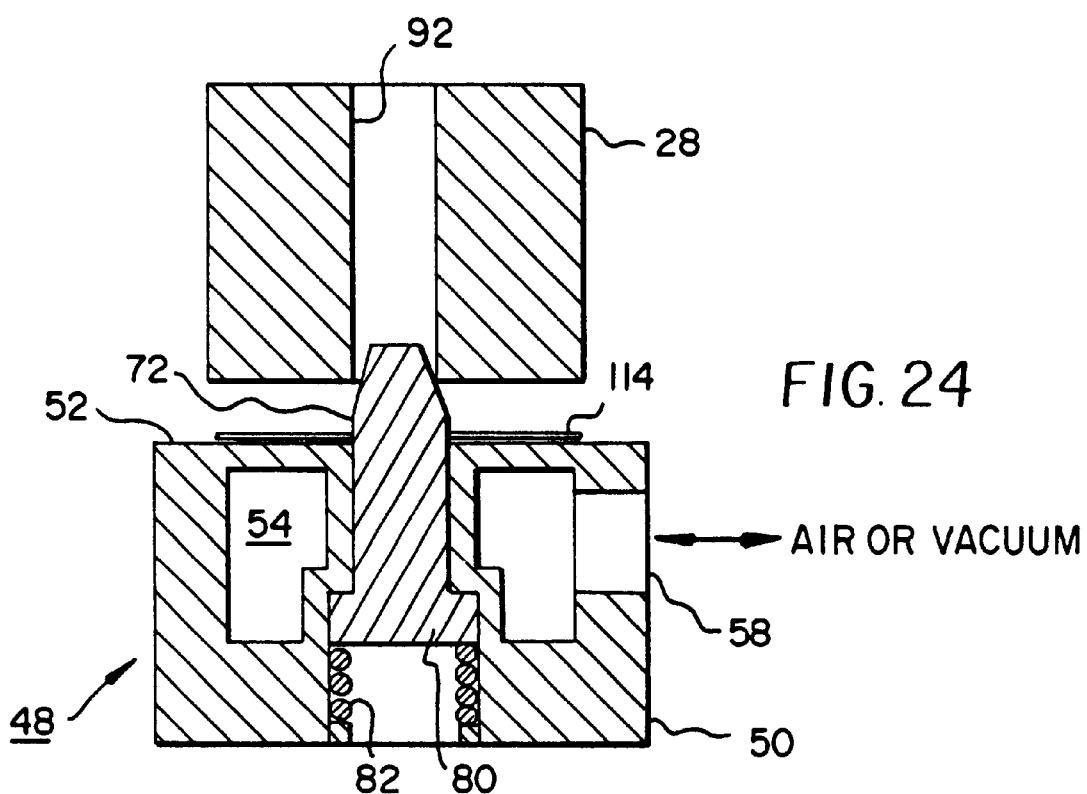

FIGS. 20–24 illustrate another labeler head 48 which also is particularly suited for applying labels 114 having a central hole 108 and a peripheral notch 70. In this instance, locator pin 72 can be withdrawn below support surface 52 by any convenient means such as a solenoid or air cylinder (not illustrated), to permit label 14 to be presented and accurately positioned in a different manner. Thus, the diameter of locator pin 72 can be substantially less than that of hole 108. To facilitate adjustment of the lateral positions of stops 60 and to allow the stops to be depressed to the level of support surface 52, support surface 52 preferably ends at a recess having an edge 84 which along a portion of its length is shaped geometrically similarly to the portion of label 14 comprising notch 70. Opposite this portion of edge 84 and extended over the recess are stops 60, laterally positioned so that the first stop can engage one side of notch 70 and the second stop can engage the periphery of label 14 on the opposite side of notch 70 from the first stop, as seen most clearly in FIGS. 20 and 23. The label 114 is presented to support surface 52 along a path directly toward stops 60. Rather than the circular array of bores of the embodiment of FIGS. 16–19, a first pair of bores 86 are provided on the opposite side of locator pin 72 from stops 60 and are directed at angles toward opposite sides of locator pin 72; a second pair of bores 88 are directed directly toward stops 60 on opposite sides of locator pin 72; and a single, angular orientation bore 90 nearest stops 60 is directed at an angle toward the more distant of stops 60. Bore 90 may be positioned on either side of the path of label 14. In a particular embodiment, none of the jets includes a vector force component which would oppose movement of the label 114 across support surface 52. Support surface 52 preferably is flat but also may have a cylindrical, convex shape of the type shown in FIGS. 11–12. With this arrangement, once locator pin 72 has been withdrawn, a label 114 presented in the direction shown will be moved by jets 86, 88 across support surface 52 toward stops 60 and will be turned by jet 90; so that, stops 60 accurately engage notch 70 and the periphery of the label 114. Locator pin 72 can then be extended through central hole 108. As shown in FIGS. 20 and 23, in the embodiment of FIGS. 20–24 label 114 covers the portion of the array of bores 86, 88, 90 which are at least partially directed toward stops 60, when the label 114 is positioned against the stops. Thus, the circumferential edge of the label 114 is not subjected to air flows which could dislodge it from its position against the stops. Labels 114 of different shapes may be acquired and positioned using somewhat different arrays of jets and stops.

Figure 3:
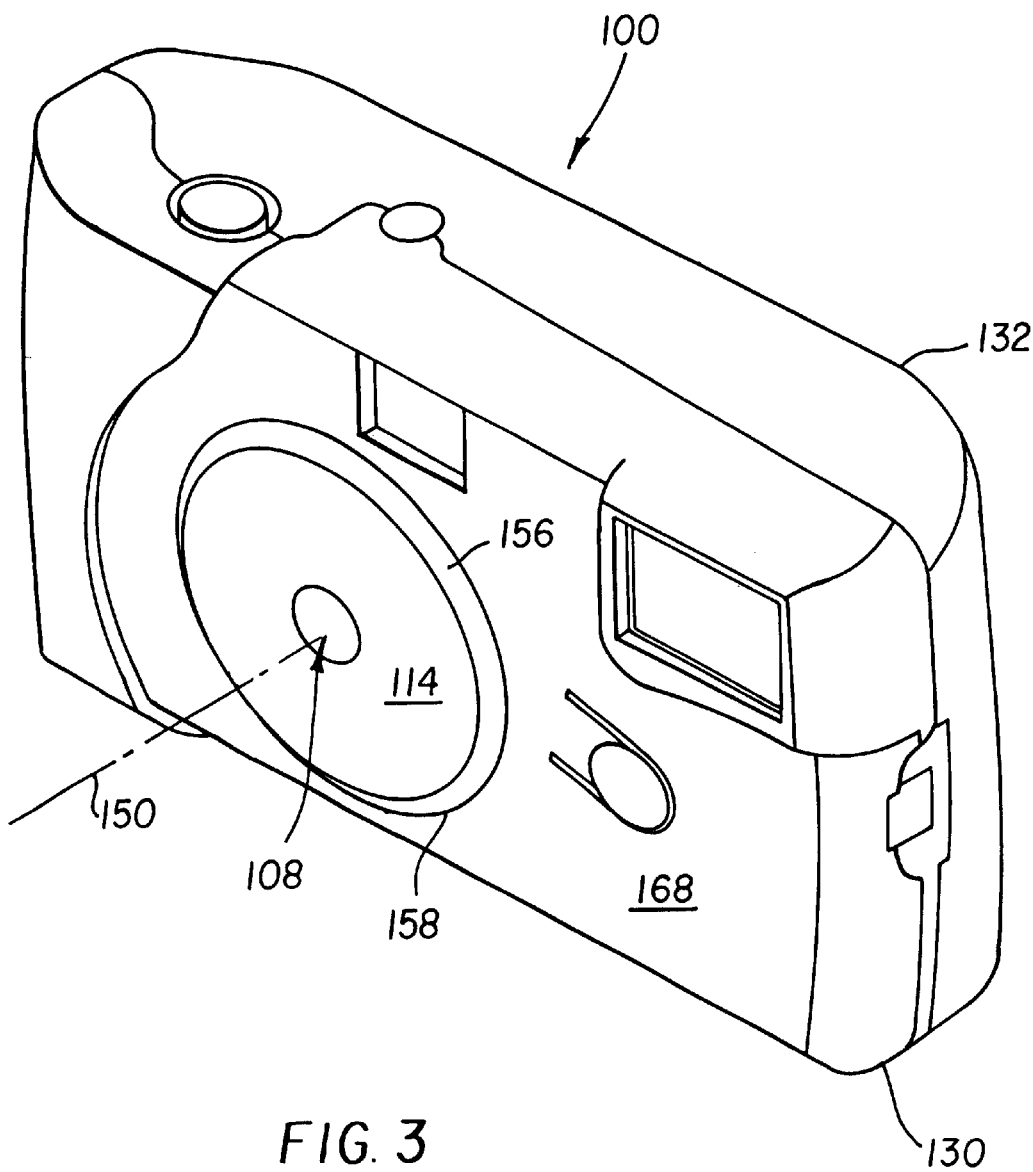
FIG. 3 is a perspective view of another embodiment of the camera.
Figure 4:
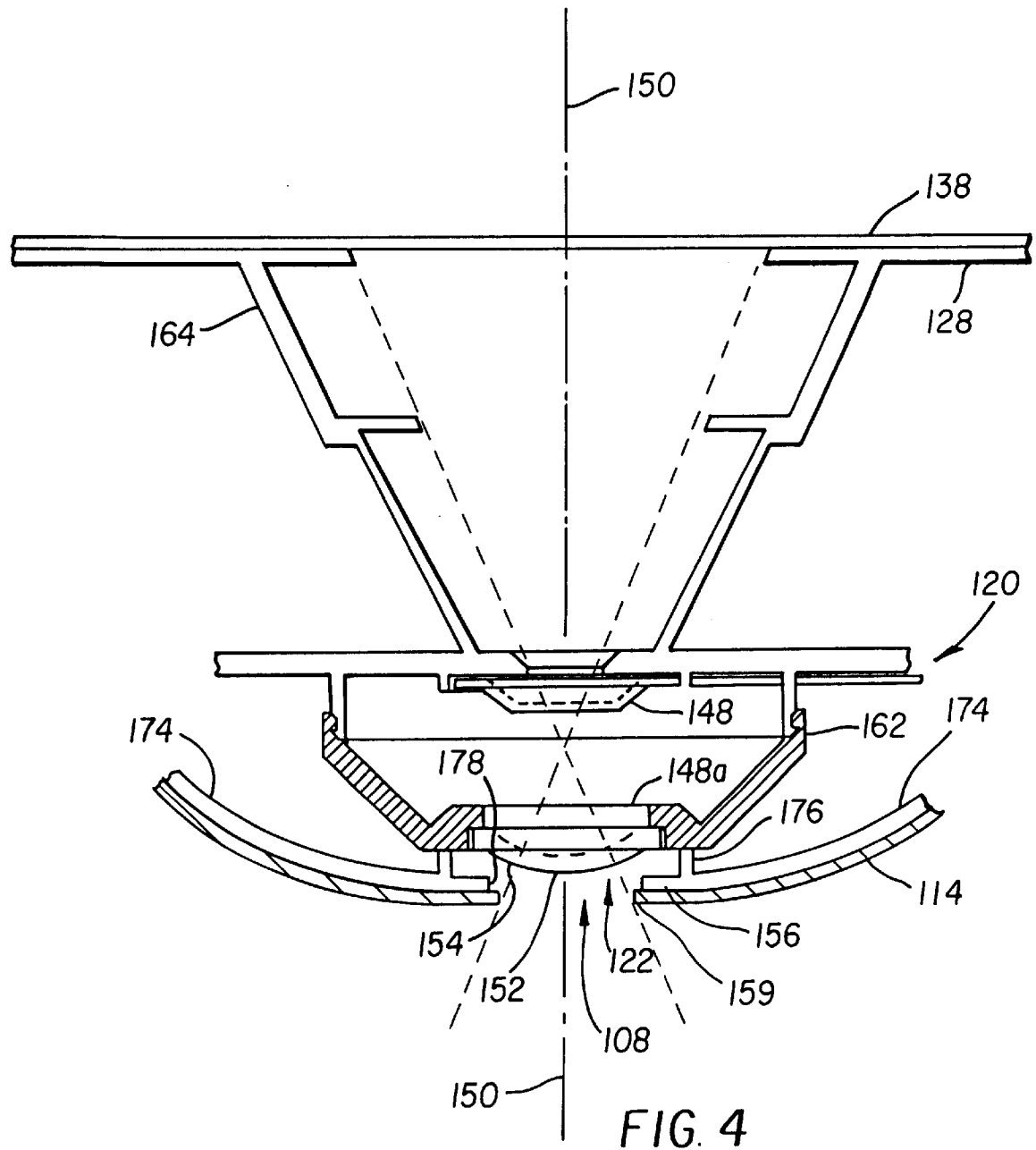
FIG. 4 is a partial cross-sectional view of the camera of FIG. 3.
Figure 5:
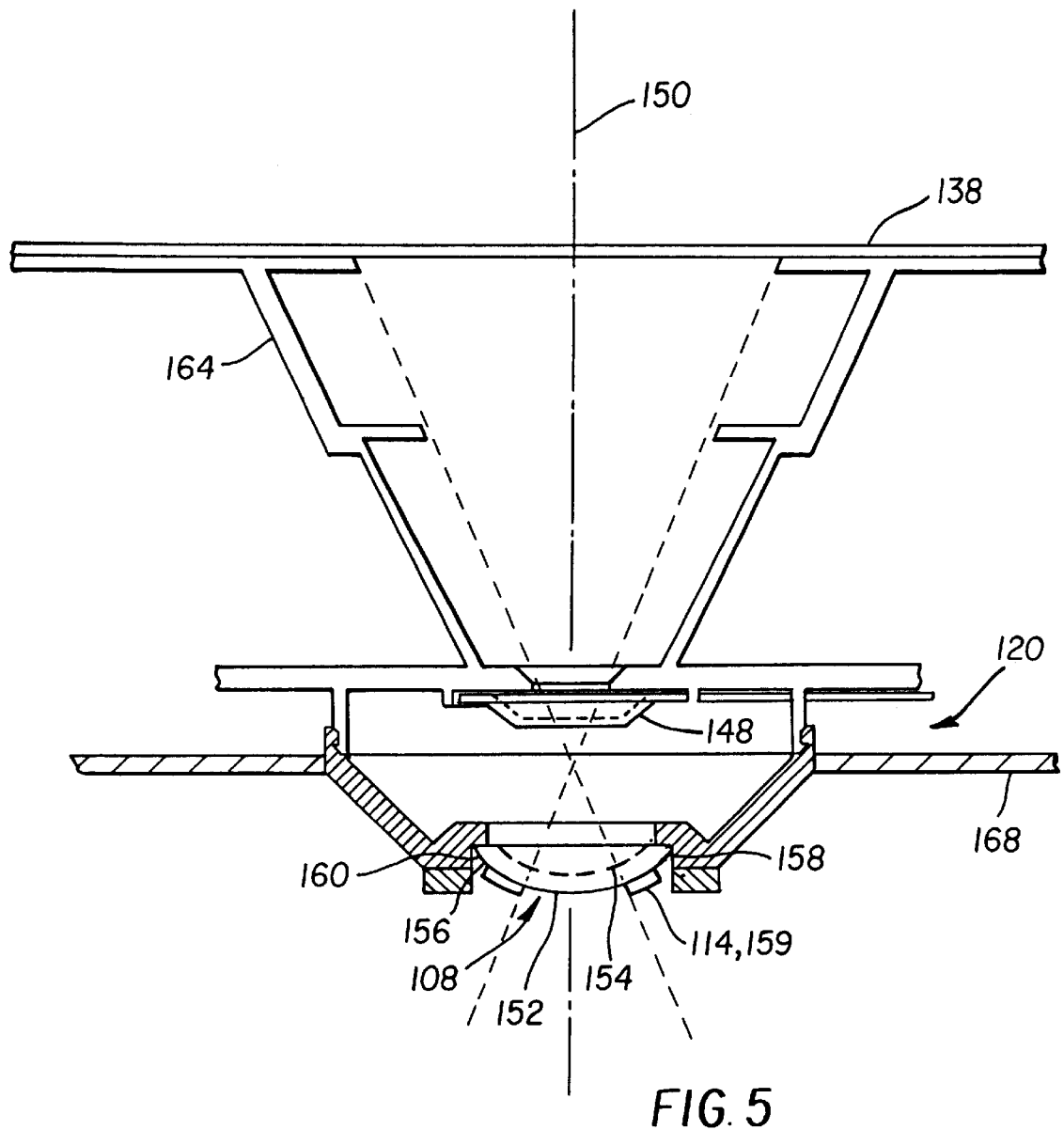
FIG. 5 is a partial cross-sectional view of another embodiment the camera.
Figure 6:
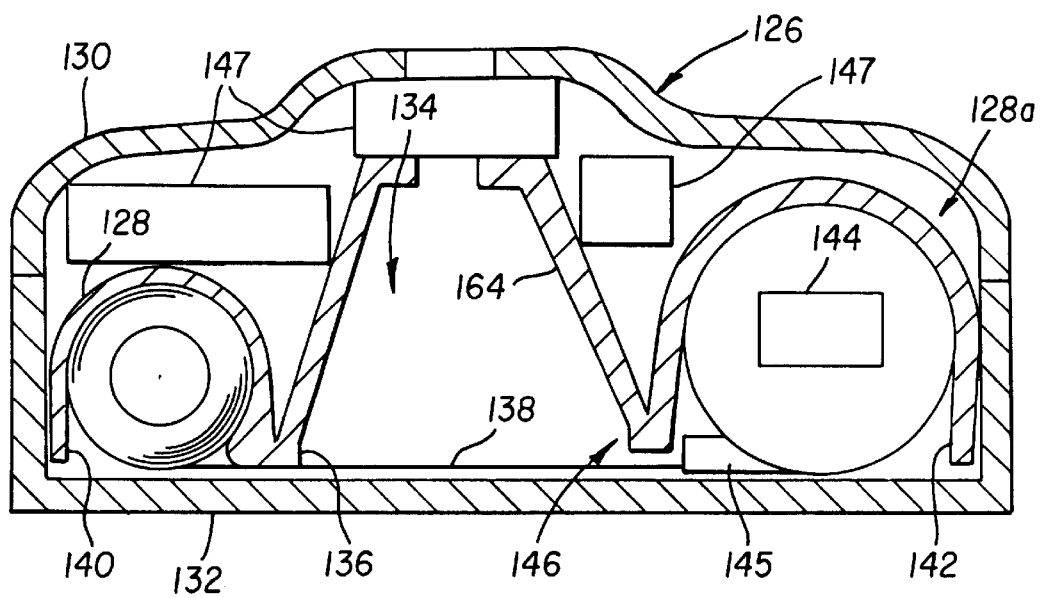
FIG. 6 is a semi-diagrammatical cross-sectional view of the camera of FIG. 1.

Referring now to FIGS. 1–7, in particular embodiments, the label receiving surface 156 is part of the inside or outside surface of lens element 148a. In these embodiments, since the label 114 is adhered directly to the lens element 148a, it is preferred that the label 114 is sufficiently compliant to accommodate lens curvature without wrinkling or folding. The lens element 148 includes the central part 152 and peripheral part 154 previously discussed, and also has a blocked part 160, which in the embodiment shown in FIG. 5, is ring shaped and disposed diametrically beyond the peripheral part 154. The outer perimeter of the lens element 148a, which, in this embodiment, is also the outer perimeter 158 of the label receiving surface 156, is encircled by and directly contacts the cradle 120. The blocked part 160 of the lens element 148 does not include light paths into the film area 134, since light entry is blocked by interposed parts of the cradle 120. The label receiving surface 156 overlies both the peripheral part 154 of the lens element 148a and the blocked part 160. The label 114 is annular and is sized to cover the peripheral part 154 and a margin of the blocked part 160, but is not so large that the cradle 120 could be used as positioning guide during label 114 placement.

Referring to FIGS. 1–4, in some embodiments, the label receiving surface 156 is part of the cradle 120. The cradle 120 has a lens holder 162 that is attached to the frame 128. The taking lens 112 has a pair of lens elements 148 that are supported by the lens holder 162 in spaced relation to each other. The frame 128 includes a light baffle 164 that directs the cone of light transmitted by the taking lens 112 to a filmstrip 138 held within the exposure chamber 136. The cradle 120 includes a center section 166 of the front cover 130. In the embodiment shown in FIGS. 1–2, the center section 166 protrudes forward relative to a distal section 168 of the front cover 130. At the middle of the center section 166 is opening 122 which transmits light to the taking lens 112. Surrounding the opening 122 is a base 170. Adjoining and extending axially outward from the base 170 is a short cylindrical wall 172. The wall 172 is joined to a cowling portion 174 of the center section 166 that extends from the wall 172 outward to the distal section 168 of the cover 130. Extending inward from the base 170 is a support 176 that contacts the lens holder 162 and helps prevent the center section 166 of the front cover 130 from bending inward during use. The opening 122 is in the center of the base 170. The outer surface of the base 170 is the label receiving surface 156. An inner perimeter 178 of the label receiving surface 156 defines the opening 122. The outer perimeter 158 adjoins the cylindrical wall 172. The label 114 is annular in shape and has a hole 108 that is centered on the optical axis 150. The label 114 is spaced from the cylindrical wall 172, since the outer diameter of the label 114 is smaller than the corresponding outer diameter of the base 170. The inner diameter of the label 114 is smaller than the corresponding inner diameter of the base 170. Thus, the label 114 protrudes axially inward beyond the base 170, overlapping the inner perimeter 178 and blocking part of the opening 122. The protruding part of the label 114 is supported only by the remainder of the label 114 and it is therefore preferred that the protruding portion is small in diameter relative to the rest of the label 114. The base 170 is preferably opaque to block stray light from entering the camera 100 beyond the outer margin of the label 114, but the base 170 can be transparent or can have a transparent section if stray light is otherwise excluded. The camera 100 can also be modified to provide a transparent support for the label 114, such as an optically transparent plate (not shown) affixed to the base 170. This allows a greater extension of the label 114 over the opening 122, since the label 114 is fully supported. Use of a transparent member or section adds complexity and is therefore not preferred.

Figure 2:
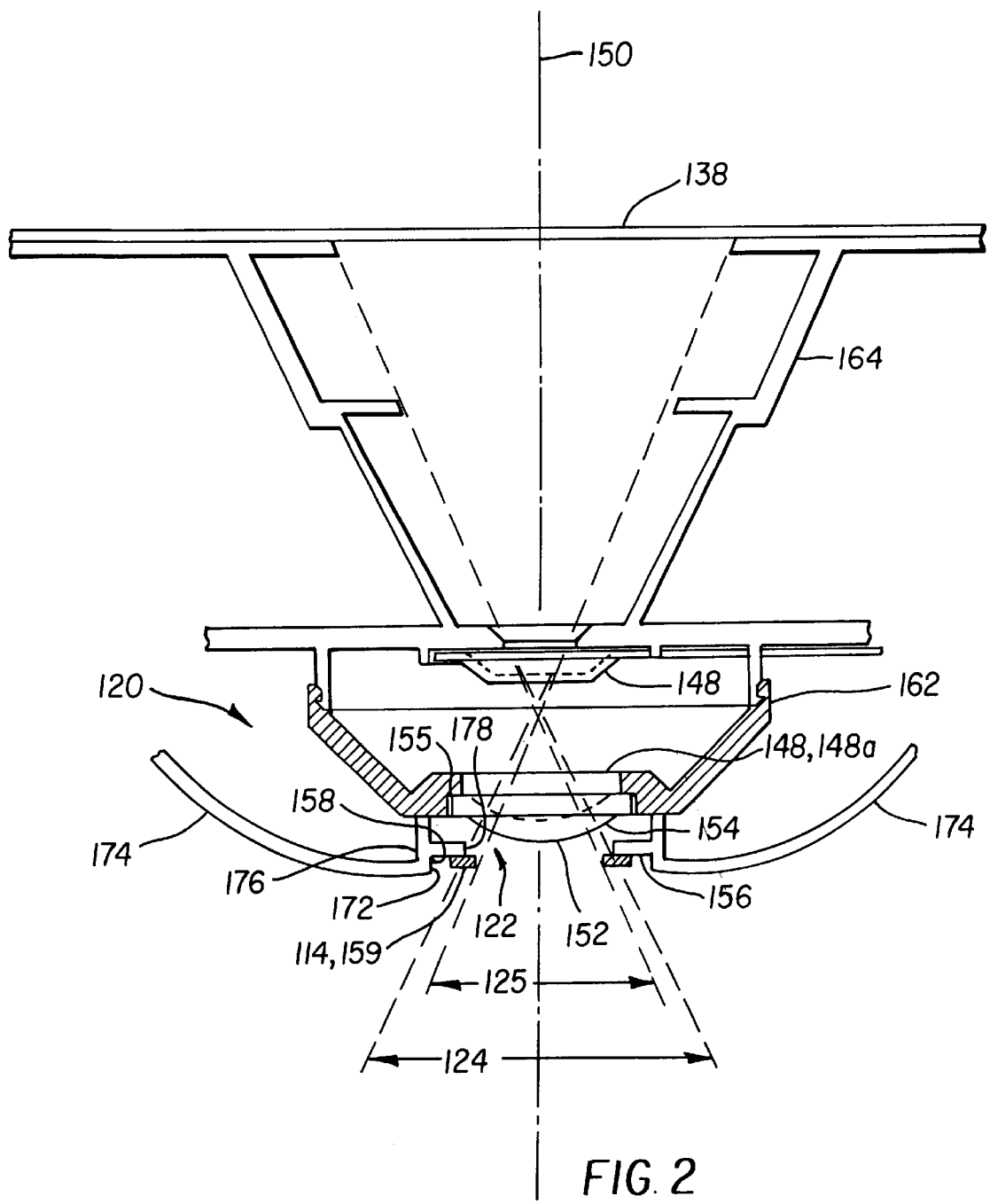
FIG. 2 is a partial cross-sectional view of the camera of FIG. 1.

The embodiment of FIGS. 3–4 is similar to the embodiment of FIGS. 1–2, except that the base 170 and the cylindrical wall 172 are not present and the label receiving surface 156 is the outer surface of the entire center section 166 of the front cover 130. The inner perimeter 178 of the label receiving surface 156 defines the opening 122. The outer perimeter 158 adjoins the distal section 168 of the cover. The label 114 overlaps the inner perimeter 178 of the label receiving surface 156 and the peripheral part 154 of the optical element. In this embodiment it is preferred that the label 114 is sufficiently compliant to closely fit the center section 166 of the front cover 130 without wrinkling or buckling.

In the embodiments of the invention shown in FIGS. 1–5, the label 114 is adhered to the outside of the camera body 116 and the label 114 is spaced apart from the taking lens 112. The label 114 can be adhered to an inner surface of the front cover 130 or part of the frame 128 and can be in contact with the taking lens 112.

The invention has been described in detail with particular reference to certain preferred embodiments thereof, but it will be understood that variations and modifications can be effected within the spirit and scope of the invention.

What is claimed is:

1. A camera comprising:
a body defining a film area and having a lens assembly including a taking lens, said taking lens defining an optical axis, said taking lens having at least one optical element, said optical element having a central part and a peripheral part, said parts providing light paths, unblocked by said body, into said film area, said optical element having a label receiving surface, said label receiving surface having an outer perimeter; and
a label adhered to said label receiving surface in spaced relation to said outer perimeter, said label having a hole disposed substantially concentric with said optical axis, said label including an opaque blocking portion surrounding said hole and overlapping said peripheral part;
wherein said label receiving surface is free of obstructions to light-tight placement of said label in any of a variety of positions on said label receiving surface and said lens assembly includes a cradle supporting and partially enclosing said taking lens.

2. A camera comprising:
a taking lens having at least one optical element, said optical element having an optical axis;
a cradle supporting said taking lens, said cradle having an opening aligned with said optical axis, said opening and said taking lens defining a first field of view, said cradle having a label receiving surface surrounding said opening; and
a label adhered to said label receiving surface, said label having a hole aligned with said opening, said label blocking light originating in a part of said field of view from entering said opening.

3. The camera of claim 2 wherein said label receiving surface is opaque.

4. The camera of claim 2 wherein said label is concentric with said optical axis to within a tolerance of ±0.3 mm.

5. The camera of claim 2 wherein said label is concentric with said optical axis to within a tolerance of ±0.2 mm.

6. The camera of claim 2 wherein said label is concentric with said optical axis to within a tolerance of ±0.1 mm.

7. A camera comprising:
a taking lens defining an optical axis, said taking lens having at least one optical element;
a cradle supporting and partially enclosing said taking lens, said cradle having a uniformly smooth label receiving surface, said label receiving surface having an inner perimeter and an outer perimeter, said inner perimeter and said taking lens defining an initial optical aperture; and
a label adhered to said label receiving surface in spaced relation to said outer perimeter, said label having a hole disposed substantially concentric with said optical axis, said label stopping said taking lens down to a final optical aperture smaller than said initial optical aperture.

8. The camera of claim 7 wherein said label overlaps said inner perimeter.

9. The camera of claim 7 wherein said label is spaced from said taking lens.

10. The camera of claim 7 wherein said label receiving surface is curved and said adhered label is compliant, wrinkle-free and fold-free.

11. A camera comprising:

a body defining a film area and having a lens assembly including a taking lens, said taking lens defining an optical axis, said taking lens having at least one optical element, said optical element having a central part and a peripheral part, said parts providing light paths, unblocked by said body, into said film area, said optical element having a label receiving surface, said label receiving surface having an outer perimeter; and a label adhered to said label receiving surface in spaced relation to said outer perimeter, said label having a hole disposed substantially concentric with said optical axis, said label including an opaque blocking portion surrounding said hole and overlapping said peripheral part;

wherein said label receiving surface is free of obstructions to light-tight placement of said label in any of a variety of positions on said label receiving surface and said label receiving surface is curved and said adhered label is compliant, wrinkle-free and fold-free.

12. A camera comprising:

a body defining a film area and having a lens assembly including a taking lens, said taking lens defining an optical axis, said taking lens having at least one optical element, said optical element having a central part and a peripheral part, said parts providing light paths, unblocked by said body, into said film area, said optical element having a label receiving surface, said label receiving surface having an outer perimeter; and a label adhered to said label receiving surface in spaced relation to said outer perimeter, said label having a hole disposed substantially concentric with said optical axis, said label including an opaque blocking portion surrounding said hole and overlapping said peripheral part;

wherein said label receiving surface is free of obstructions to light-tight placement of said label in any of a variety of positions on said label receiving surface and said peripheral part of said lens element includes a molded-in support structure.

13. The camera of claim 12 wherein said optical element has an outside surface and an inside surface and said label is adhered to said outside surface.

14. A camera comprising:

a body having a lens assembly including a taking lens and a light-blocking blocking cradle supporting and partially enclosing said taking lens, said taking lens defining an optical axis, said taking lens having at least one optical element, said optical element having a central part and a peripheral part, said cradle having a label receiving surface, said label receiving surface having an outer perimeter, said label receiving surface being free of obstructions to label-placement; and a label adhered to said label receiving surface in spaced relation to said outer perimeter, said label having a hole disposed substantially concentric with said optical axis, said label including an opaque blocking portion surrounding said hole and overlapping said peripheral part.

15. The camera of claim 14 wherein said label receiving surface has an inner perimeter opposite said outer perimeter and said label overlaps said inner perimeter.

16. The camera of claim 14 wherein said label receiving surface is free of protuberances.

17. The camera of claim 14 wherein said label receiving surface is uniformly smooth.

18. The camera of claim 14 wherein said label receiving surface is curved and said label is compliant.

19. The camera of claim 14 wherein said cradle has a base and a cylindrical wall adjoining said base, said base including said label receiving surface, said base having an opening surrounded by said label receiving surface, said label being adhered to said label receiving surface in spaced relation to said wall.

20. The camera of claim 14 wherein said cradle includes a cover section and said label is adhered to said cover section.

21. The camera of claim 14 wherein said label is concentric with said optical axis to within a tolerance of ±0.3 mm.

22. The camera of claim 14 wherein said label is concentric with said optical axis to within a tolerance of ±0.2 mm.

23. The camera of claim 14 wherein said label is concentric with said optical axis to within a tolerance of ±0.1 mm.

24. The camera of claim 14 wherein said label is annular.

* * * * *